(12) United States Patent
Hillis et al.

(10) Patent No.: US 6,507,357 B2
(45) Date of Patent: Jan. 14, 2003

(54) METHOD AND APPARATUS FOR MAINTAINING EYE CONTACT IN TELECONFERENCING USING REFLECTED IMAGES

(75) Inventors: William Daniel Hillis, Toluca Lake, CA (US); Bran Ferren, Beverly Hills, CA (US); Clinton Blake Hope, Burbank, CA (US)

(73) Assignee: Applied Minds, Inc., Glendale, CA (US)

( * ) Notice: Subject to any disclaimer, the term of this patent is extended or adjusted under 35 U.S.C. 154(b) by 48 days.

(21) Appl. No.: 09/852,491

(22) Filed: May 9, 2001

(65) Prior Publication Data

US 2002/0063774 A1 May 30, 2002

Related U.S. Application Data

(60) Provisional application No. 60/250,955, filed on Nov. 29, 2000.

(51) Int. Cl.⁷ .................................................. H04N 7/12
(52) U.S. Cl. ................................. 348/14.16; 348/14.01
(58) Field of Search .......................... 348/14.01, 14.16, 348/14.07, 14.08

(56) References Cited

U.S. PATENT DOCUMENTS

| 5,612,734 A | * | 3/1997 | Nelson et al. | 348/14.16 |
| 5,666,155 A | * | 9/1997 | Mersereau | 348/14.16 |
| 6,042,235 A | * | 3/2000 | Machtig et al. | 348/14.16 |

* cited by examiner

*Primary Examiner*—Wing Chan
(74) *Attorney, Agent, or Firm*—Michael A. Glenn (57) ABSTRACT

The image of a local user is captured from a beam splitter disposed in front of a video display. By canting the beamsplitter away from the surface of the video display, the bore-sight of the video camera is made to coincide with the line of sight from the local user to the center of the video display. This enables the arrangement to convey eye-contact from one user to another user using the same type of apparatus at a remote location.

16 Claims, 6 Drawing Sheets

FIG. 1

PRIOR ART

METHOD AND APPARATUS FOR MAINTAINING EYE CONTACT IN TELECONFERENCING USING REFLECTED IMAGES

This application claims the benefit of Provision Application No. 60/250,955, files Nov. 29, 2000.

BACKGROUND OF THE INVENTION

1. Technical Field

This invention relates to the field of teleconferencing, and more specifically to a method and apparatus that promote eye contact between participants in a video teleconference.

2. Description of the Prior Art

Face-to-face conversation is universally recognized as the preferred form of human contact. In business, this preference for direct human contact is manifest through person-to-person conversations and meetings where a plurality of persons participate in the exchange of information. So fundamental is the need to communicate directly, that even when people are geographically dispersed, meetings are arranged to bring people from different cities together to communicate ideas and debate issues.

It is well known that bringing people together can be an expensive proposition. Even when people work only a few hundred feet from each other, as for instance on different floors of an office building, time is wasted by walking to the other person's office. When the distances are more extreme, people incur travel expenses and waste time in transit just so that they can talk to each other directly. The almost primal need to communicate face-to-face provides the rational basis for incurring the overhead expenses inherent in getting parties together for the purposes of direct communication.

Almost from the dawn of recorded history, there have been efforts to abridge the distances between people who want to speak to each other. Signal drums in the jungle and smoke signals used by native Americans are just two examples of such efforts. Modernly, effective methods for allowing people to communicate across distances began with the telephone. Using the telephone, people could talk to each other in a natural fashion. The only thing that was missing is that two people talking over a telephone could not see each other.

The visual element of communication is extremely important. In business communications, body language can convey subconscious messages from one person to the other. Many people learn how to read and rely on these signals in order to qualify the verbal content of the conversation. Imagine what poker would be like if the visual tell-tales were eliminated from the game. This is why extensive resources have been dedicated to the development of video teleconferencing systems. By adding a video capability to a telephone call, otherwise tacit information could again be perceived.

In a typical video teleconferencing system, each participant faces a video display device. The system also includes a microphone, a speaker, and a video camera. The video camera is normally positioned immediately above the video display and is pointed toward the local conversation participant. Using video teleconferencing, people speaking to each other could again read body language as one way of ascertaining the unspoken messages behind a conversation.

Body language is a strong signaling means and many people have learned to interpret the underlying unspoken messages. Unfortunately, many aspects of reading body language rely on eye contact between the two people engaged in conversation. Because the bore-sight of the camera is not coincident with the participant's view-sight of the video display, known video teleconferencing systems can not convey eye contact between the people engaged in conversation. Consequently, many of the body language messages that involve eye contact can not be interpreted by either side.

One prior art solution to the eye contact problem was to use a beam-splitter to allow the user to view a reflected image of the video display while a video camera captures a head-on view of the user through the beam-splitter. A physical limitation in this prior art technique required positioning the beam-splitter at a 45° angle to the surface of the video display. If the angle were any less than 45°, the image on the display screen would show up in the image captured by the camera. Because of the large minimum angle of 45°, implementations of the prior art were very bulky and awkward.

SUMMARY OF THE INVENTION

The invention comprises a method and apparatus for conveying eye contact from one video teleconferencing participant to another. According to the method, a video signal is received from a remote location and comprises an image of a remote participant. This signal is then presented onto a video display. The method further calls for the placement of a beam-splitter in front of the video display. The beam-splitter is canted away from the surface of the video display at an angle less than 45°.

A local participant is positioned in front of the video display and his image, as reflected by the beam-splitter, is captured by a video camera. The reflected image of the local user, as captured by the video camera, appears superimposed on a portion of the remote image displayed on the video screen. The remote video signal is clipped and morphed to account for the field of view of the video camera and the oblique perspective view of the video display perceived by the video camera. The processed rendition of the remote signal corresponds to the background captured by the video camera and this background signal is electronically removed from the image captured by the video camera. The resultant signal contains only the reflected image of the local participant.

In one alternative embodiment, the method calls for capturing the reflected image of the local participant directly from the surface of the video display. In this alternative, a beam-splitter is not required, but the local user is disposed with and in angular displacement from the normal of the video display surface.

In all embodiments, a plurality of targets may be inserted into the video signal received from the remote location. These targets facilitate the coincident subtraction of the background image from the image captured by the camera leaving only the reflected image of the local user represented in the resultant video signal.

DETAILED DESCRIPTION OF THE INVENTION

Figure 1:
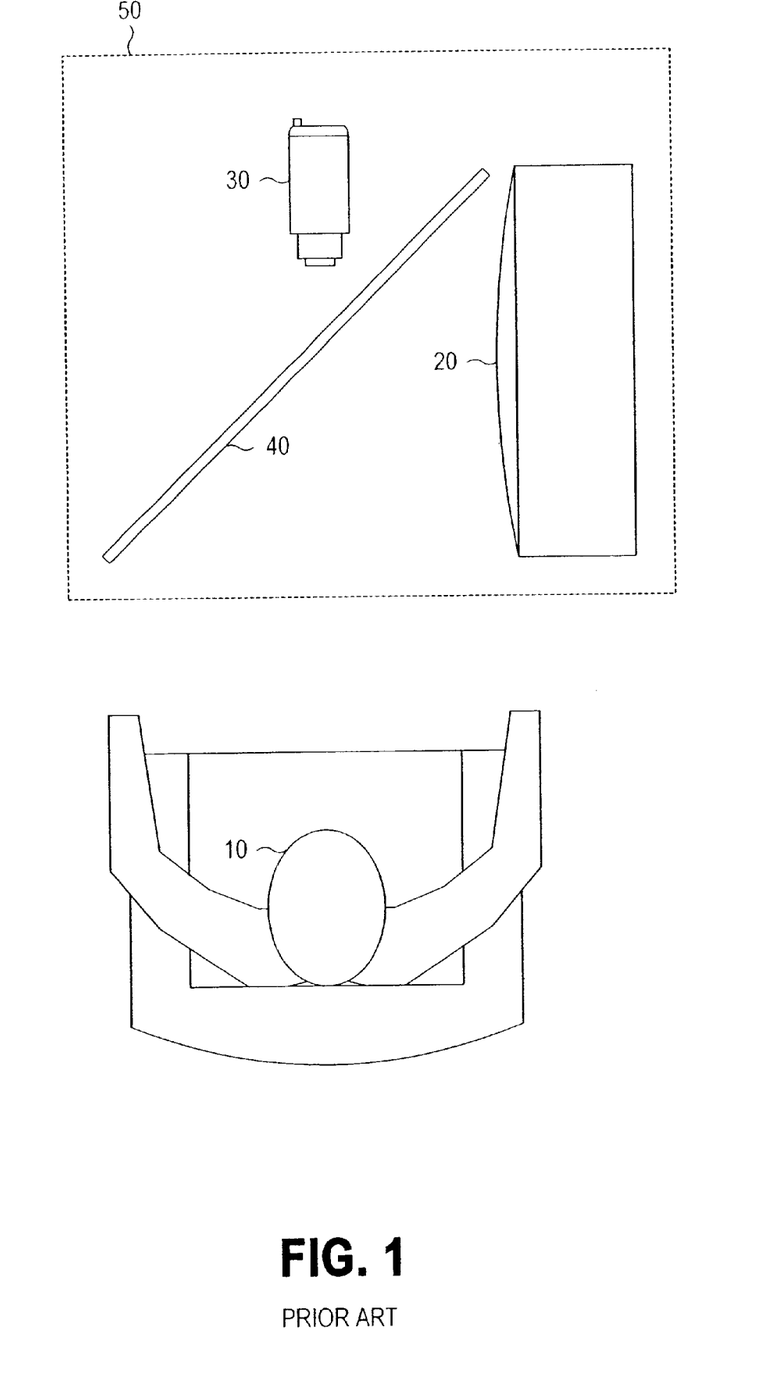
FIG. 1 is a pictorial representation of a prior art video teleconferencing system based on a beam-splitter.

FIG. 1 is a pictorial representation of a prior art video teleconferencing system based on a beam-splitter. A camera 30 is placed behind the beam-splitter 40. The video display 20 is disposed in such a fashion that the view sight of the video display 20 is substantially orthogonal to the bore-sight of the camera 30. The beam-splitter 40 reflects the image from the video display 20 so that the person 10 using the apparatus can see the image. The camera 30 captures the image of the person using the apparatus directly through the half-silvered mirror 40. Use of the system provides a sense of eye contact for the remote participant. However, this terminal arrangement 50 does not offer a front surface view. The user experiences a recessed image. The recessed image results in a diminished sense of immediacy and presence. This reduces the quality of the eye contact.

Figure 2:
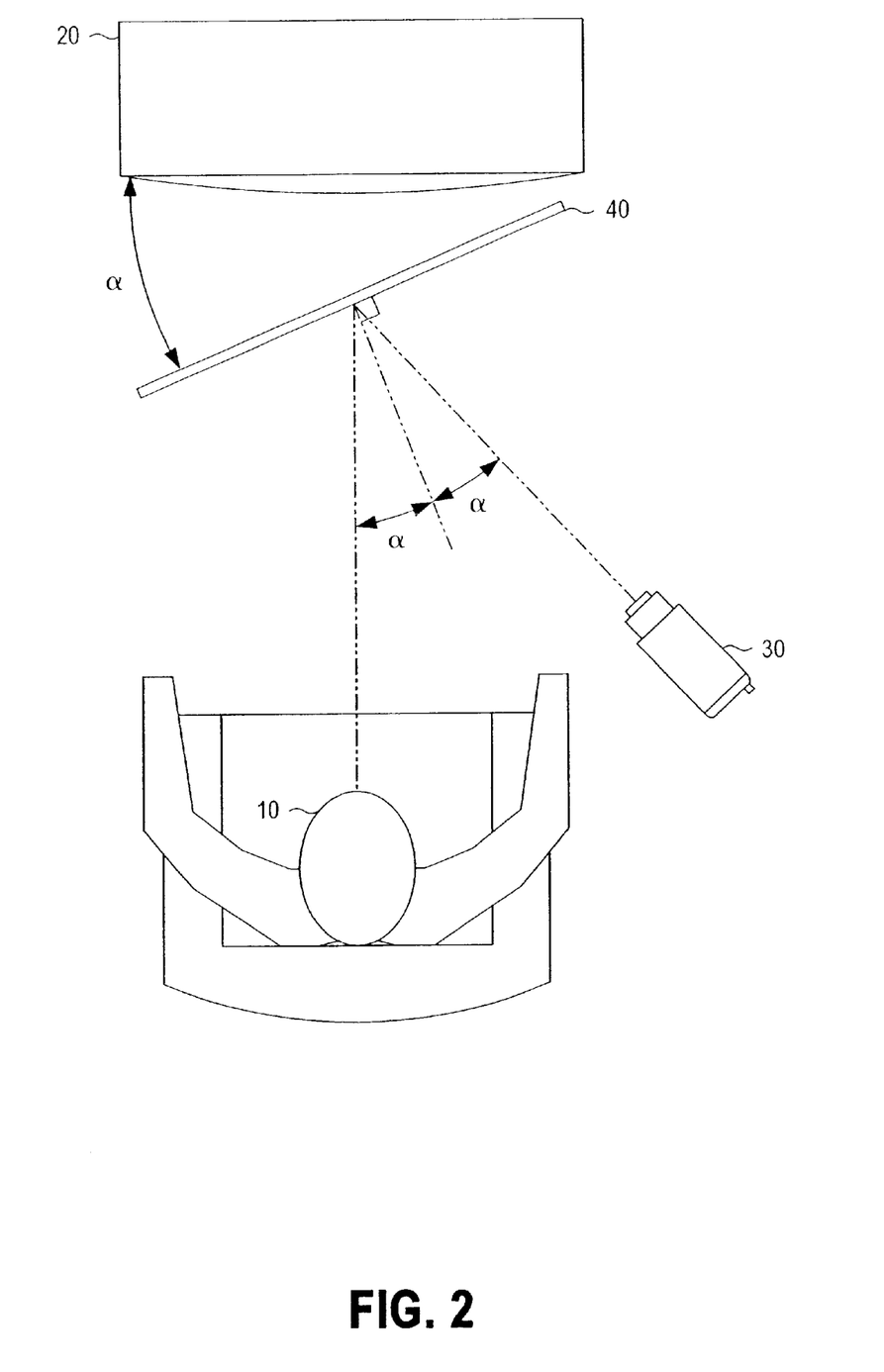
FIG. 2 is a pictorial representation of reflective image capture according to the present invention.

FIG. 2 is a pictorial representation of reflective image capture according to the invention. In the preferred embodiment, a video display 20 is disposed in front of a user 10 using the video teleconferencing system. A beam-splitter 40 is disposed in between the user 10 and the video display 20. The beam-splitter 40 is set at an angle of less than 45° so that the distance between the surface of the video display 20 and the user 10 is not excessive. Normally, the user 10 should be no more than two feet away from the display surface. In the preferred embodiment, the beam-splitter is canted from the surface of the video display 20 by 15°, but the actual angle can be adjusted to suit the preference of the user. For purposes of discussion, the cant angle is referred to as "α."

Defining the view sight of the video display as the line of sight from the user 10 to the center of the surface of the video display, a video camera 30 is disposed in a manner where it is pointed at the beam-slitter 40, the camera's bore-sight being incident on the beam-splitter at the point where the display view-sight passes through the beam-splitter. The video camera 30 is further disposed such that the bore-sight of the camera is orthogonal from the plane of the beam-splitter 40 less an angle equivalent to the canter of the beam-splitter 40 from the surface of the video display 20. Hence, the bore sight of the camera 30 is 90°–α relative to the plane of the beam-splitter 40. The camera 30 is further disposed in a manner such that the angular displacement between the bore sight of the camera 30 and the view sight of the video display is twice that of the canterd angle of the beam-splitter 30 from the surface of the display 20, i.e. 2α.

Figure 3:
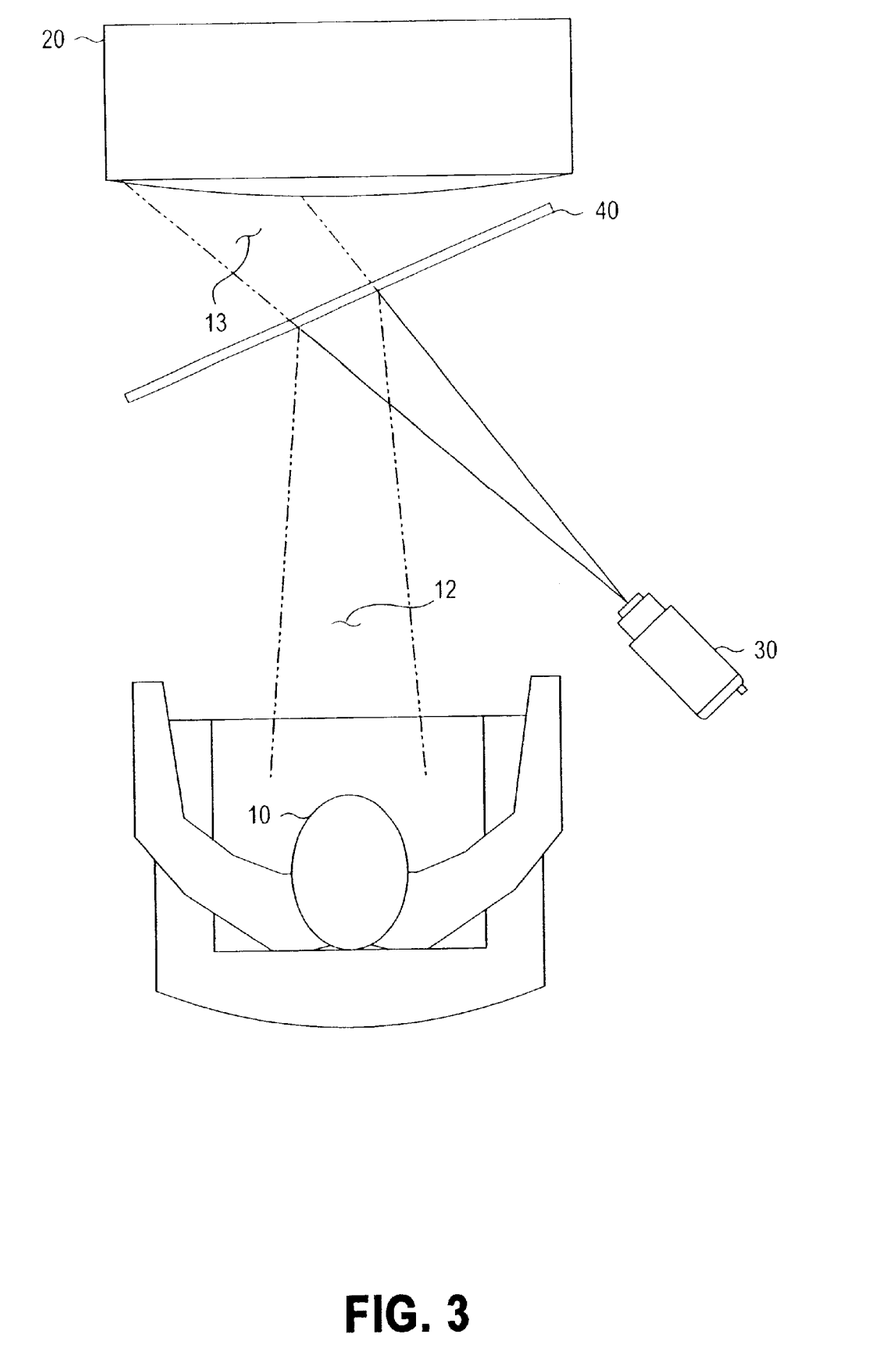
FIG. 3 is a pictorial representation of the field of view perceived by the video camera.

FIG. 3 is a pictorial representation of the field of view perceived by the video camera. With the video camera 30 disposed in this manner, the reflected field of view 12 of the camera 30 captures the face of the user 10. Because the beam-splitter 40 is canted from the surface of the video display 20 at an angle substantially less than 45°, the direct field of view 13 of the video camera 30 also captures a portion of the image presented on the video display screen 20. The image of the user's face therefore appears superimposed on the image displayed on the video display 20.

Figure 4:
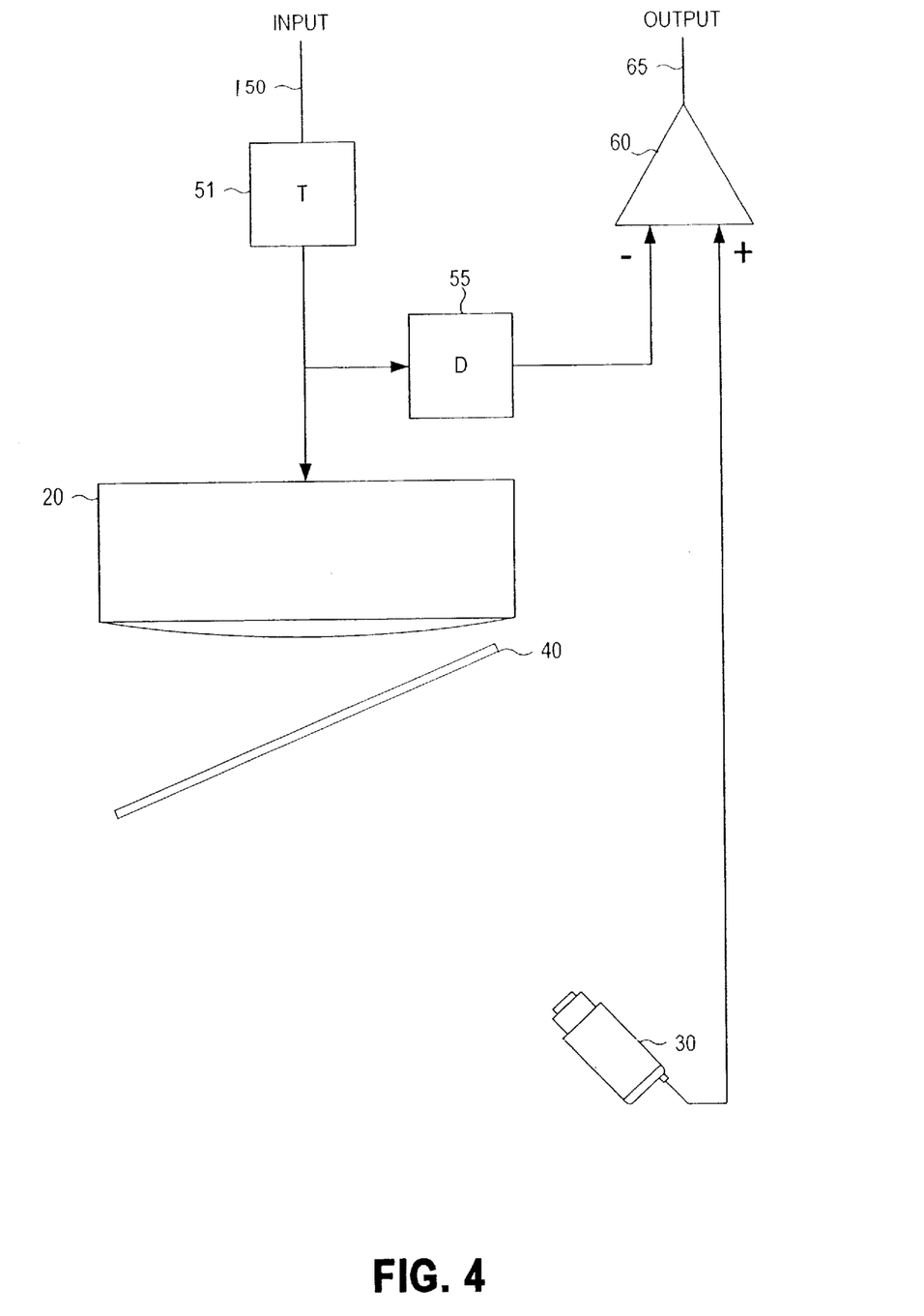
FIG. 4 is a pictorial representation of the processing schema required to extract the image of the local user.

FIG. 4 is a pictorial representation of the processing schema required to extract the image of the local user. The video signal 150 that is provided to the video display 20 is generated by some external source. It will normally include an image of the person using an equivalent apparatus at a remote site. This video signal 150 is subjected to a clipping and morphing process 55. The clipping aspect of this process extracts a region of the video signal corresponding to that found in the direct field of view 13 of the video camera 30. Morphing is performed to account for the oblique perspective view that the video camera 30 perceives in the direct field of view 13. The output of the clip and morph process 55 is then forwarded to a summation element 60.

The summation element 60 comprises a non-inverting input and an inverting input. The video output of the video camera 30 is presented to the summation element 60 non-inverting input. The signal provided by the video camera 30 comprises the reflected image of the user 10 superimposed on the background image presented on the video display 20. The clipped and morphed output represents the background image captured by the video camera 30. This signal is presented to the inverting input of the summation element 60. The resulting output 65 comprises the image of the user as reflected by the beam-splitter 40.

Figure 5:
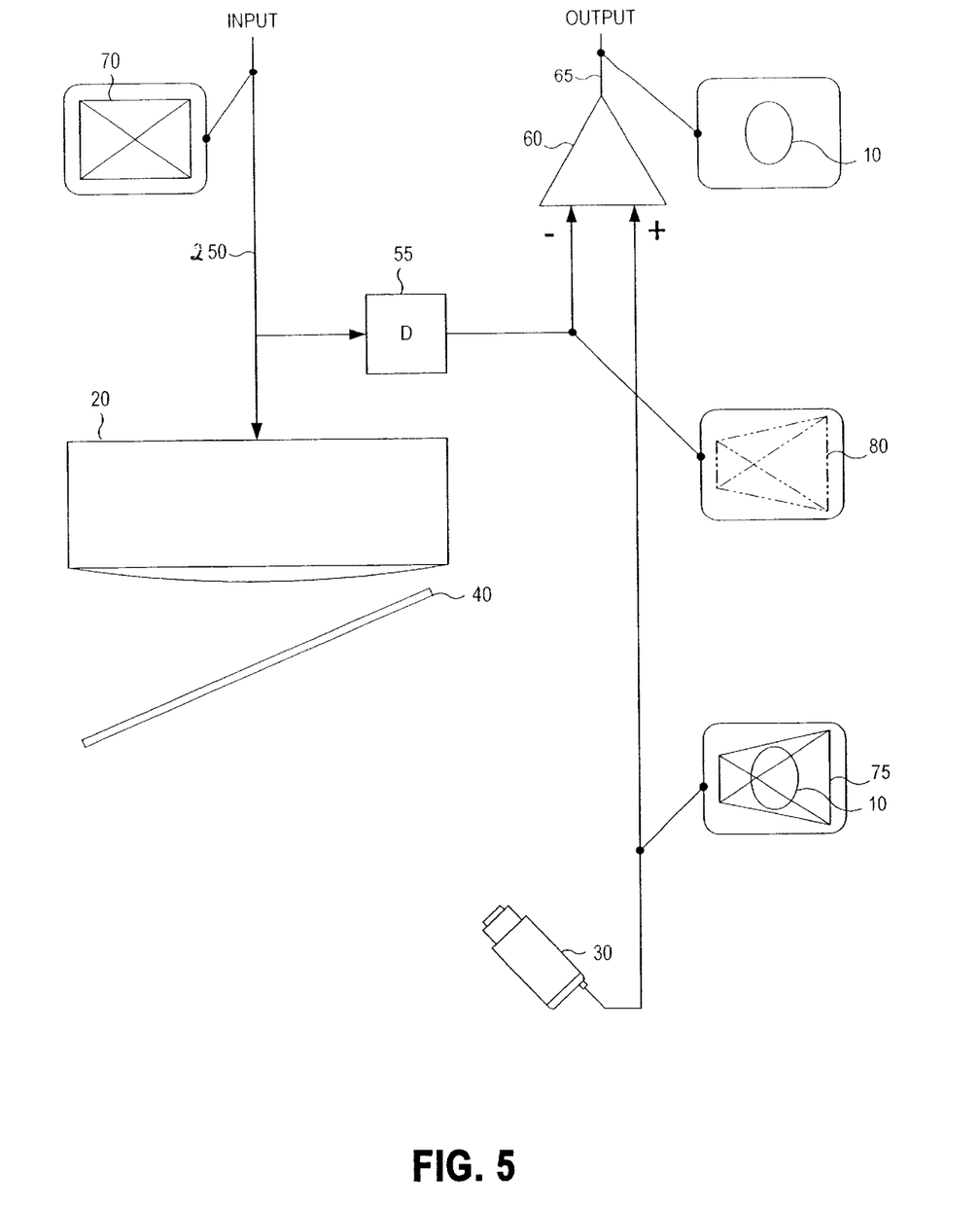
FIG. 5 is a pictorial representation of the substance of the video signals as they are propagated through the processing schema according to the present invention.

FIG. 5 is a pictorial representation of the substance of the video signals as they are propagated through the processing schema according to the invention. The image of a remote participant is received on a remote video signal 250. The remote image 70 comprises some background image and an image of the remote participant. For the purpose of this description, the actual contents of the image are not important, in fact the figures represent this as an "X"-out image 70. This remote image 70 is presented on the local video display 20.

The video camera 30 captures a reflected image of a local participant 10 superimposed onto a portion of the remote image presented on the video display 20. This background, as captured by the video camera 30, bears a reference number of 75 in FIG. 5. Note that the background image 75 is an oblique perspective view and that it does not capture the entire display region of the video display 20.

The original video signal 250 is also directed to an image processing element 55. The image processing element 55 crops the signal so that the clipped output 80 corresponds to that portion of the video display 20 that is captured by the video camera 30. The clipped output 80 is also morphed in a manner corresponding to the perspective view of the video display 20 perceived by the video camera 30.

The clipped and morphed output 80 is presented to the inverting input of a summation device 60 while the output of the video camera is presented to the non-inverting input of the summation device 60. The resultant output signal 65 comprises only the reflected image of the local participant 10. This result is achieved because the morphed output of the image processing element 55 is exactly coincident with the background perceived by the video camera 30. Targets are optionally injected into the remote video signal 50 at a plurality of positions on the displayed image to facilitate the image processing. This is performed by an optional target insertion unit 51. The target insertion unit 51 is disposed in the path of the incoming video signal arriving from a remote location and before the signal is directed to the video display 20 or the image processing element 55. These targets allow the summation device to ensure that the subtraction of the background image 80, i.e. the output of the image processing element 55, are exactly coincident. Note that the targets are present in the clipped and morphed output and in the video signal captured by the video camera 30 because the targets are displayed on the video display 20.

Figure 6:
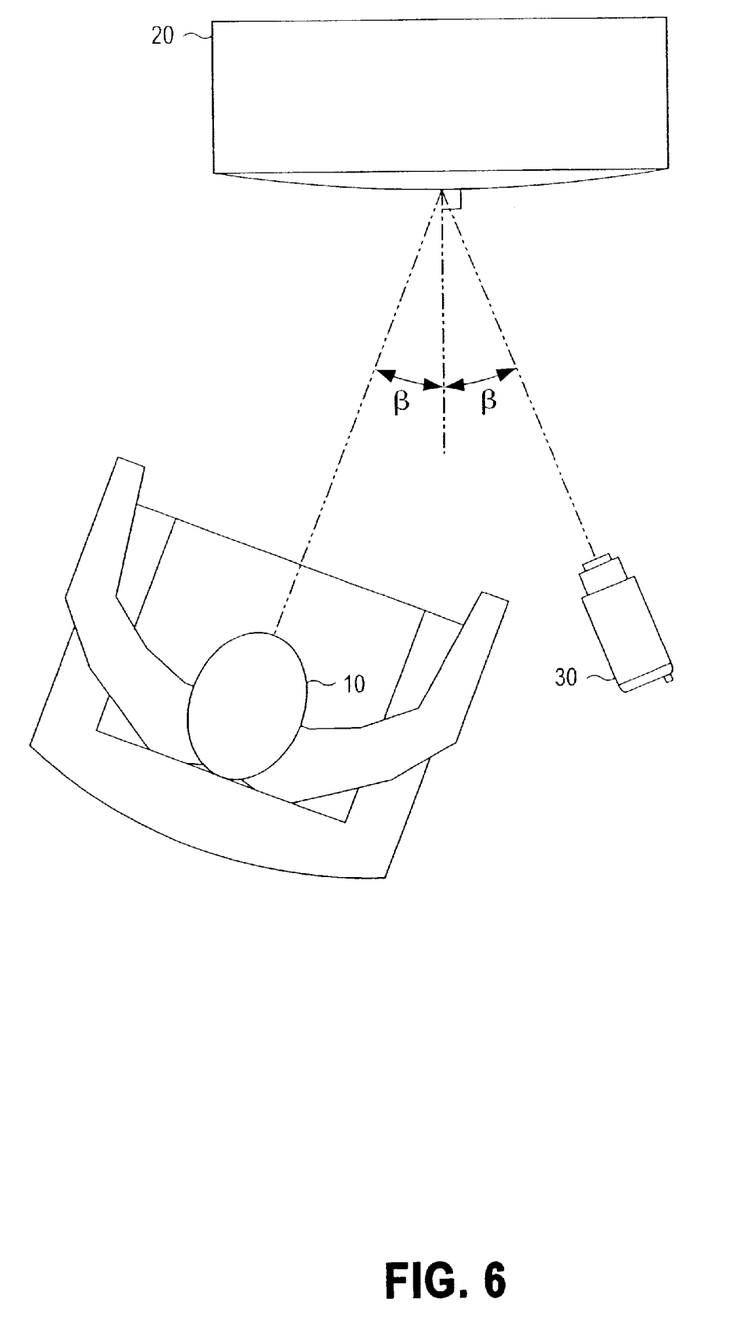
FIG. 6 is an alternative embodiment of reflected image capture according to the present invention.

FIG. 6 is an alternative embodiment of reflected image capture according to the invention. In this alternative, the local user 10 is positioned at some angle from the normal of the surface of the display screen 20. The angle is unimportant so long as the local user 10 can properly view the display 20 and that a video camera 30, aimed at the intersection of the display screen normal and the view sight of the user, can capture an image of the user 10 reflected by the surface of the video display 20. In this case, the boresight of the video camera 30 must be angled away from the normal of the video display to the same extent as the user line of sight. This angle is referred to as "β."

Just as in the preferred embodiment, the background image displayed on the video screen 20 is removed by image processing. The background is developed by clipping and morphing the original video signal displayed on the video display 20 and a summation device removes the background. Targets may be impressed into the video signal to facilitate the coincident subtraction of the background image from the reflected image captured by the video camera 30.

Alternative Embodiments

While this invention has been described in terms of several preferred embodiments, it is contemplated that alternatives, modifications, permutations, and equivalents thereof will become apparent to those skilled in the art upon a reading of the specification and study of the drawings. It is therefore intended that the true spirit and scope of the invention include all such alternatives, modifications, permutations, and equivalents. Some, but by no means all of the possible alternatives are described herein.

We claim:

1. A method for conveying eye contact from one video teleconference participant to another, comprising the steps of:

presenting a video signal comprising an image of a remote participant onto a display screen;

positioning a beam-splitter in front of said display screen, the beam-splitter offset from the front surface of said display by an angle of less than about 45°;

capturing an image of a local participant reflected from the beam-splitter together with a portion of the video signal presented on the display screen;

clipping and morphing the video signal so that it corresponds to the portion of the video signal presented on the display screen and captured; and subtracting the clipped and morphed video signal from the captured image of the local participant and portion of the video signal presented on the display screen to create a resultant local participant image signal.

2. The method of claim 1, further comprising the steps of:

sending the resultant local participant image signal to a remote site; and displaying the resultant local participant image signal on a display at the remote site as a video signal of a remote participant.

3. The method of claim 1, further comprising the step of:

imposing a plurality of targets onto the video signal comprising an image of the remote participant to ensure coincident subtraction of the clipped and morphed video signal from the video signal created by the video camera.

4. A method for conveying eye contact from one video teleconference participant to another, comprising the steps of:

presenting a video signal comprising an image of a remote participant onto a display screen;

capturing an image of a local participant reflected from the surface of the display screen together with a portion of the video signal presented on the display screen;

clipping and morphing the video signal so that it corresponds to the portion of the video signal presented on the display screen and captured; and subtracting the clipped and morphed video signal from the captured image of the local participant and portion of the video signal presented on the display screen to create a resultant local participant image signal.

5. The method of claim 4, further comprising the steps of:

sending the resultant local participant image signal to a remote site; and displaying the resultant local participant image signal on a display at the remote site as a video signal of a remote participant.

6. The method of claim 4, further comprising the step of:

imposing a plurality of targets onto the video signal comprising an image of the remote participant.

7. An apparatus for conveying eye contact from one video teleconference participant to another, comprising:

a video display that presents a video signal received from a remote location;

a beam-splitter disposed in front of the video display and oriented at an angle of less than about 45° relative to a display surface of said video display;

a video camera that captures a reflected image of a local user from the beam-splitter together with a portion of the image displayed on the video display and creates a local video signal comprising these images;

an image processing element that receives the video signal from the remote location and clips the signal and morphs the signal to result in a video signal that corresponds to the portion of the image captured by the video camera that is displayed on the video display; and a summation unit having an inverting input and a non-inverting input and that receives the clipped and morphed video signal from the image processing element at the inverting input and the local video signal created by the video camera and subtracts the signal arriving at the inverting input from the signal arriving at the non-inverting input in a coincident manner.

8. The apparatus of claim 7, further comprising:

a video transmitter that receives the output of the summation device and directs that video output to a remote location and a video display at the remote location that displays the video signal received from the video transmitter.

9. The apparatus of claim 7, further comprising:

a target insertion unit that imposes a plurality of targets onto the video signal received from the remote location and wherein the summation unit uses the plurality of targets to ensure coincident subtraction of the clipped and morphed video signal from the video signal created by the video camera.

10. An apparatus for conveying eye contact from one video teleconference participant to another, comprising:

a video display that presents a video signal received from a remote location;

a beam-splitter disposed in front of the video display and oriented at an angle of less than about 45° relative to a display surface of said video display;

a video camera that captures a reflected image of a local user from said beam-splitter together with a portion of the image displayed on the video display and that creates a local video signal comprising these images;

an image processing element that receives the video signal from said remote location and that processes said signal to produce a video signal that corresponds to the portion of the image captured by the video camera that is displayed on the video display; and a combining unit that receives said processed signal from the image processing element and the local video signal created by the video camera and that processes said processed signal and said local video signal to produce a signal that contains only the reflected image of the local user.

11. The apparatus of claim 10, further comprising:

a video transmitter that receives the output of the combining unit and directs that video output to a remote location and a video display at the remote location that displays the video signal received from the video transmitter.

12. The apparatus of claim 10, further comprising:

a target insertion unit that imposes a plurality of targets onto the video signal received from the remote location and wherein the combining unit uses the plurality of targets to ensure coincidence of a clipped and morphed video signal from the video signal created by the video camera.

13. A method for conveying eye contact from one video conference participant to another, comprising the steps of:

presenting an image of a remote participant on a local display;

positioning a beam splitter in front of said display at an angle of less than about 45° relative to a display surface of said display; capturing an image of a local participant that is reflected from said beam splitter when said local participant is viewing said local display along with at least a portion of the remote participant image presented on said local display; and subtracting at least a portion of a remote participant image from said capture image.

14. An apparatus for conveying eye contact from one video teleconference participant to another, comprising:

a first display for presenting a video signal comprising an image of a remote participant onto a display screen;

a camera for capturing an image of a local participant reflected from the surface of the display screen together with a portion of the video signal presented on the display screen;

a processor for clipping and morphing the video signal so that it corresponds to the portion of the video signal presented on the display screen and captured; and said processor subtracting the clipped and morphed video signal from the captured image of the local participant and portion of the video signal presented on the display screen to create a resultant local participant image signal.

15. The apparatus of claim 14, further comprising:

means for sending the resultant local participant image signal to a remote site; and a second display for displaying the resultant local participant image signal on a display at the remote site as a video signal of a remote participant.

16. The apparatus of claim 14, further comprising:

said processor imposing a plurality of targets onto the video signal comprising an image of the remote participant.

* * * * *